No. 710,114. Patented Sept. 30, 1902.
E. E. MENGES.
NIPPLE.
(Application filed Apr. 17, 1902.)

(No Model.)

UNITED STATES PATENT OFFICE.

EDWARD E. MENGES, OF NEW HAVEN, CONNECTICUT, ASSIGNOR TO THE SEAMLESS RUBBER CO., OF NEW HAVEN, CONNECTICUT, A CORPORATION.

NIPPLE.

SPECIFICATION forming part of Letters Patent No. 710,114, dated September 30, 1902.

Application filed April 17, 1902. Serial No. 103,257. (No model.)

*To all whom it may concern:*

Be it known that I, EDWARD E. MENGES, of New Haven, in the county of New Haven and State of Connecticut, have invented a new and useful Improvement in Nipples for Nursing-Bottles; and I do hereby declare the following, when taken in connection with the accompanying drawings and the letters of reference marked thereon, to be a full, clear, and exact description of the same, and which said drawings constitute part of this specification, and represent, in—

Figure 1:
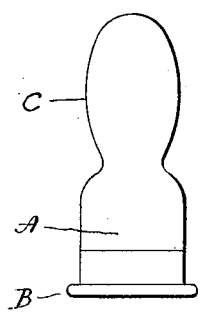
Figure 2:
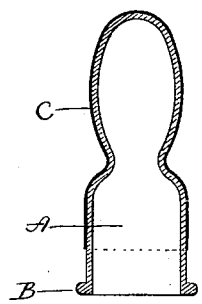

Figure 1, a side view of a nipple for nursing-bottles constructed in accordance with my invention; Fig. 2, a sectional view thereof.

This invention relates to an improvement in nipples for nursing-bottles.

Desirable features of nipples for nursing-bottles are that they shall be sufficiently rigid to prevent collapsing and shall have a very smooth surface, not only to avoid injuring the mouth, but to prevent the lodgment of foreign matter. To accomplish these objects, nipples have been filled with substances and have also been vulcanized or cured in various ways; but fillings are objectionable and in curing or finishing the nipples to give them a smooth surface has detracted from their rigidity, so that they readily collapse.

The object of this invention is to produce a nipple having a very smooth surface and one sufficiently rigid to avoid the necessity of filling; and the invention consists in the nipple and the method of producing the same as will be hereinafter described, and particularly recited in the claim.

The nipple A is flexible and may be of any approved design and is formed in the usual way by molding or dipping and then vulcanizing. The nipple thus formed is then given one or more coats C, of pure rubber, which is cured in the usual manner. This additional auxiliary coating gives a very smooth finish to the surface of the nipple and reinforces the body of the nipple, so that it will not readily collapse. Preferably and as shown the coating will not extend over the entire surface, but leaves the open end or rim B of the nipple in its usual state, which is somewhat more flexible than the coated portion, permitting it to be readily placed over the neck of a bottle. This coating not only produces a smooth surface and strengthens the nipple, but makes it practically antiseptic, as it avoids the possibility of lodgment of foreign substances.

Having fully described my invention, what I claim as new, and desire to secure by Letters Patent, is—

A flexible rubber nipple for nursing-bottles having a smooth, auxiliary coating of rubber applied directly to its exterior surface, which is thereby given a smooth finish, substantially as described.

In testimony whereof I have signed this specification in the presence of two subscribing witnesses.

EDWARD E. MENGES.

Witnesses:
NISBET V. DAVENPORT,
GEORGE M. ALLERTON.